United States Patent [19]

Wright

[11] Patent Number: 5,478,039
[45] Date of Patent: Dec. 26, 1995

[54] SWIVEL HANGING APPARATUS

[76] Inventor: W. Michael Wright, 1236 Waterfront Dr. #202, Virginia Beach, Va. 23451

[21] Appl. No.: 186,612

[22] Filed: Jan. 26, 1994

[51] Int. Cl.$^6$ .................................................. B42F 13/00
[52] U.S. Cl. .................... 248/341; 248/288.31; 248/301; 248/317; 403/142
[58] Field of Search ................................... 248/339, 341, 248/317, 318, 227, 231.7, 301, 304, 225.1, 225.2, 288.3, 289.1, 290, 220.2, 323; 211/115, 116, 113; 403/142, 122, 76; 362/405, 406

[56] References Cited

U.S. PATENT DOCUMENTS

| | | |
|---|---|---|
| 309,621 | 12/1884 | Herrick et al. . |
| 1,701,683 | 2/1929 | Leas . |
| 1,713,835 | 5/1929 | Krieg . |
| 3,950,637 | 4/1976 | Rodin ..................................... 240/10 P |
| 3,957,242 | 5/1976 | Holtz ....................................... 248/318 |
| 4,098,483 | 7/1978 | Pesola et al. ..................... 248/311.1 R |
| 4,099,694 | 7/1978 | Horwitz ................................... 248/339 |
| 4,174,087 | 11/1979 | Gaines ..................................... 248/339 |

*Primary Examiner*—Ramon O. Ramirez
*Assistant Examiner*—Korie H. Chan
*Attorney, Agent, or Firm*—Richard G. Besha

[57] ABSTRACT

An overhead swivel hanging apparatus consisting of a mount(10) and a support(30), i.e. a grab. When assembled the apparatus is utilized to hang pendant objects, such as a plant or a bird cage, from a ceiling or the like. The mount is comprised of a base (12), a cross brace(14), a connective means(16), an ornamental shell (18), a pendant leg(20), and a spherical bearing (22) cast as a single piece. The support, mill stamped from tensile steel as a single piece, is an C-shaped hook with a widened U shaped grab(34) on the inferior aspect. On the superior aspect of the support is a slot(28) with a flange(24) which narrows posterior into keeper tabs(26). The keeper tabs are narrower than said slot which is wider than said leg. The internal surface has a concavity(32) bisected by the slot which facilitates a ball and socket integration with the bearing. To connect the support to the mount place the flanged end against the pendant leg and move it laterally until past the keeper tabs, thus preventing accidental uncoupling. The grab has a larger internal dimension at the top than at the bottom. Placement of the pendant object into the grab locks it into place through weight, friction, and interlocking torsion between the two pieces. Such an arrangement of components increases the rotational coeffecency by means of a ball and socket integration and the interlocking torsion on the grab.

5 Claims, 5 Drawing Sheets

SWIVEL HANGING APPARATUS

BACKGROUND OF THE INVENTION

1. Field of the Invention

A swivel device of improved design, function, and construction for hanging objects overhead. 2. Previous swivel devices for suspending objects have three major flaws. Utilizing a C or J hook design, they are functionally inept, usually requiring rotation of the hook itself by hand. Although inexpensive, they are esthetically unattractive offering few original designs and finishes. Moreover, due to their design they must be utilized only on a horizontal surface to permit ready adjustment of the angular orientation of pendant objects.

One previous device of this type was composed of two pans, the mount and the support. The mount includes a base adapted to be secured to the ceiling and a horizontal ring, with a slot, held below the base by pendant legs. The support, a J hook with an enlarged flat head, slides through the slot, rests on the ring and rotates in the bore of the ring. By suspending the weight of the pendant object on the flat head free rotational function is reduced by weight and friction. In addition, the utilization of a J shaped hook requires excessive rotation of the pendant object before engagement with and rotation of the hook. Another disadvantage is that this type of arrangement can be utilized only on a horizontal surface.

Another version of this device utilizes the same J hook design with a T shaped head. The housing includes an internal chamber, a configured entry port leading thereto and a removable plug or closure for the port. The head passes through the port for rotation in the housing chamber. This design has the same inherent design flaws associated with the aforementioned prior art.

One other version involves a C hook that is suspended, through the superior curvature, via a short shaft. This hook design allows more rotational latitude on the shaft but still requires rotating the hook itself by hand. This design also can only be utilized on a horizontal surface.

SUMMARY OF THE INVENTION

1. Purposes of the Invention

It is the object of this invention to provide a new and improved swivel hanging apparatus for pendant objects.

It is another object of the invention to provide a swivel hanging apparatus which can be easily turned by rotating the pendant object itself instead of the hook.

It is another object of the invention to provide a swivel hanging apparatus which can be adapted to a variety of ceiling styles.

Other objects of the invention in part will be obvious and in part will be pointed out hereinafter.

BRIEF DESCRIPTION OF THE INVENTION

The swivel hanging apparatus of this invention is comprised of two parts. The first part, a mount, is designed to be attached firmly to a variety of overhead surfaces. The second part, a support, includes a grab means and is secured to the first part so as to permit rotation of the grab about a vertical axis.

The first part is structured so that it can be attached firmly to a ceiling or the like. This is achieved by providing a connective means with female threads, in this design, centered in a cross brace that spans the diameter of an ornamental shell, said being an integral part of said shell. Attachment to the supporting structures is normally via a lag screw or hollow wall fastener, but any well-known form of fastening means can be utilized. The first part has an integral pendant leg on the external surface, which supports a spherical bearing upon which the second part is rotatably mounted.

The second part is a C-shaped hook of which the superior aspect is slotted for lateral introduction onto said pendant leg while the inferior aspect, the grab means, has a widened U shape. The anterior portion of said slot is flared slightly for easy introduction onto said pendant leg, tapering posteriorly and inwardly into a pair of keeper tabs, the distance between the keeper tabs being narrower than the width of the flared portion of the anterior portion of the slot. The support's superior aspect is seated on the upper hemispherical surface of said spherical bearing by a concavity on the superior internal surface of said support.

The first part is made in a single die casting operation with a low-grade steel alloy, although any alloy with sufficient strength may be utilized. The second part is mill stamped out of tensile steel.

The first part is assembled with the second part by aligning the flared end of the slot with the pendant leg and sliding it laterally around said leg past the keeper tabs. The concavity of the second part then seats on the superior hemispherical surface of the bearing and will then hang in a vertical manner. In this position said keeper tabs prevent the second part from accidently disengaging from said leg and can only be removed by forcing said keeper tabs past said leg.

The preferred material used for die casting the mount as a single piece is a low-grade steel alloy. A steel alloy is desirable for casting ease and strength. Moreover, it is easily platable and, as cast, provides a smooth surface for use as a bearing mount. The support is mill stamped out of high tensile steel, strength requirements set for the amount of weight desired to be supported.

The invention consists in the features of construction, combination of elements and arrangements of parts which will be exemplified in the swivel hanging apparatus hereinafter described and of which the scope of the application will be identified in the appended claims.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

PREFERRED EMBODIMENT OF THE INVENTION

Figure 1:
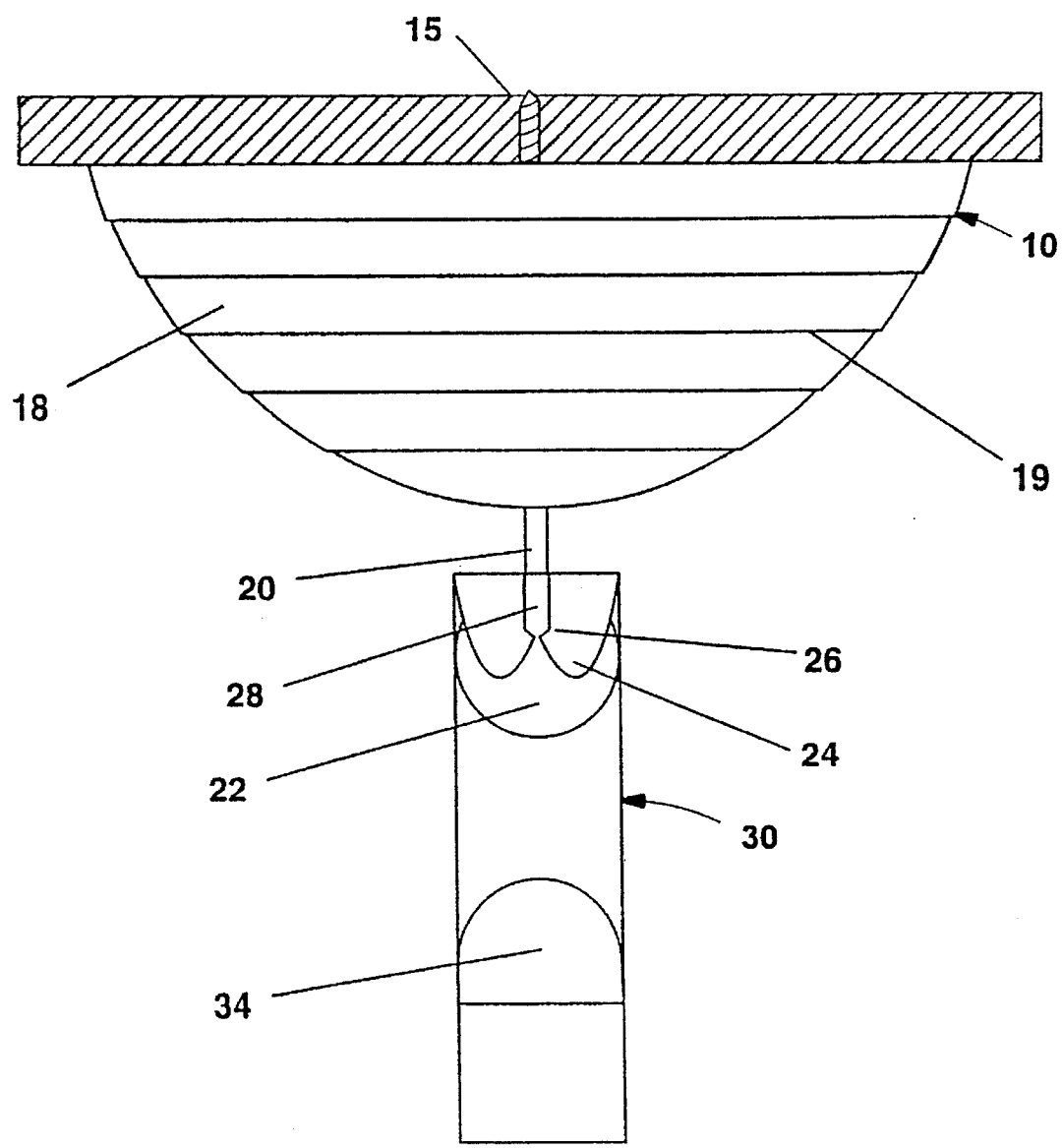
FIG. 1 is a side elevation view of the overhead swivel hanging apparatus of this invention, comprised of a mount and a support attached to a ceiling, which is shown in cross section.
Figure 2:
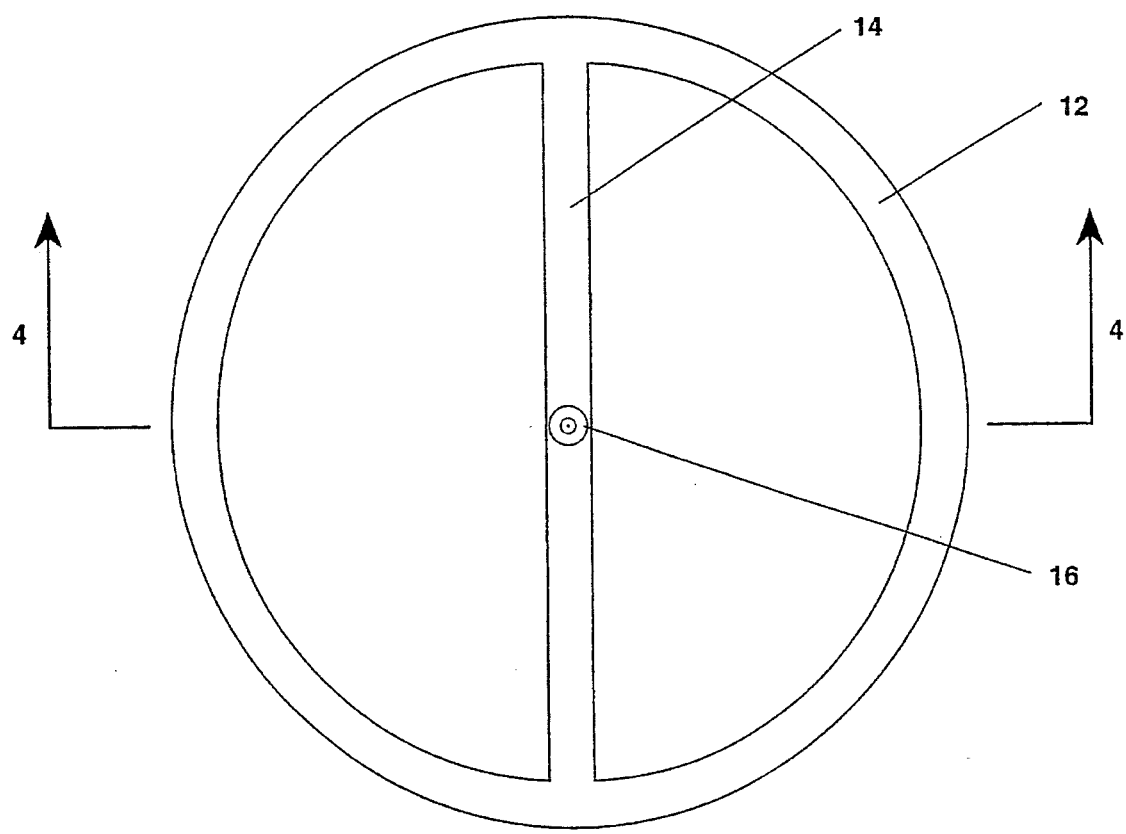
FIG. 2 is a top view of the mount of FIG. 1.
Figure 3:
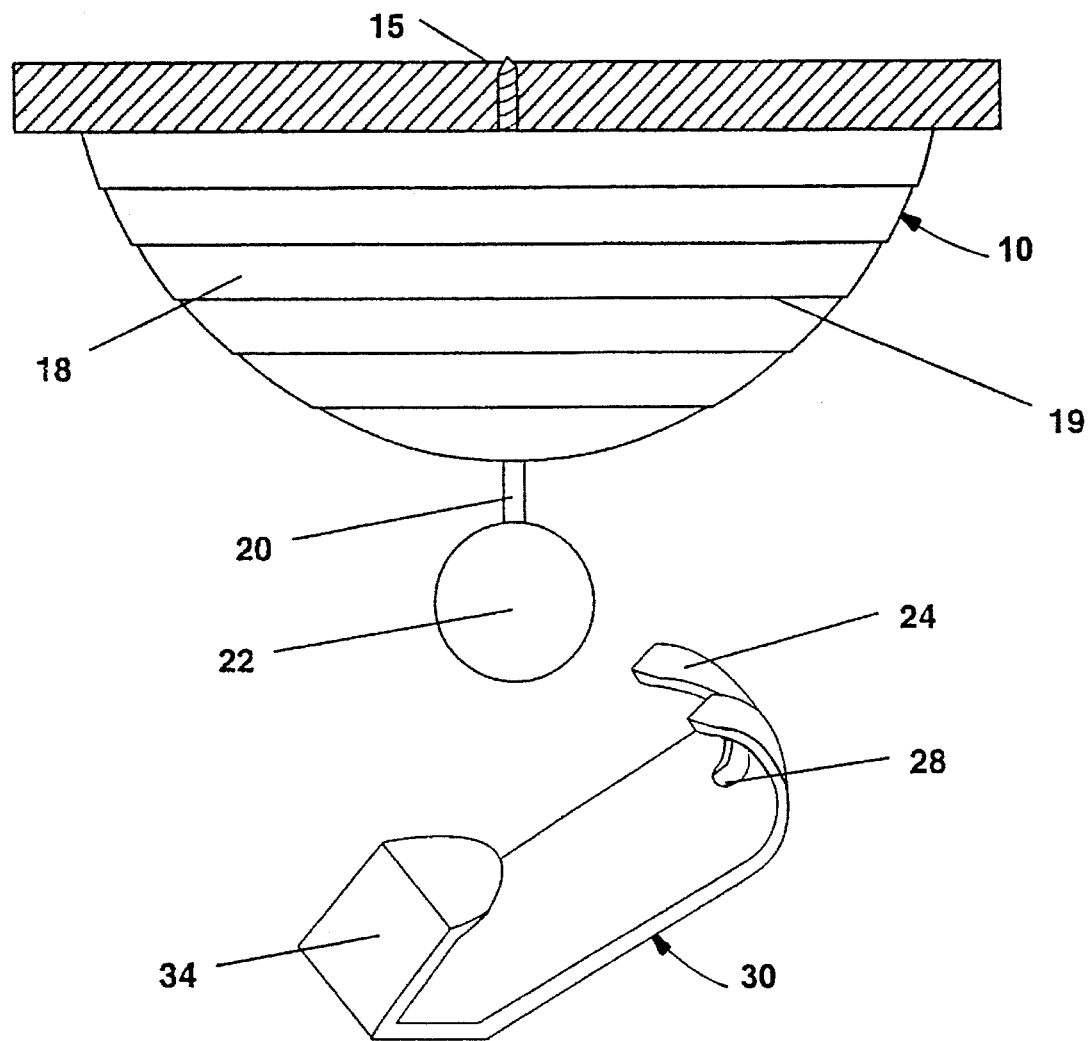
FIG. 3 is a view similar to FIG. 1 but showing the support exploded away and in perspective.
Figure 4:
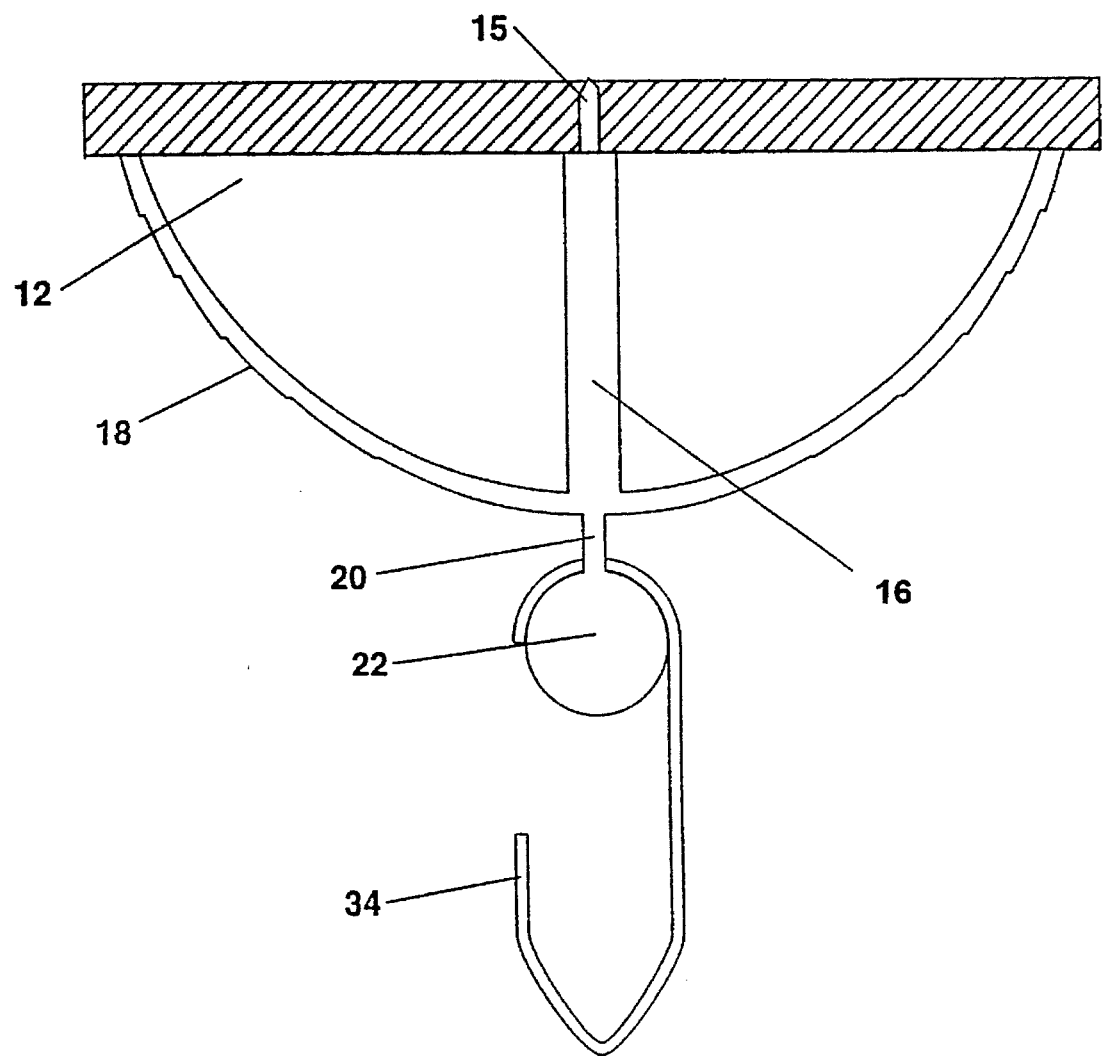
FIG. 4 is a sectional view taken in line 4—4 in FIG. 2 of the swivel hanging apparatus when assembled as in FIG. 1.
Figure 5:
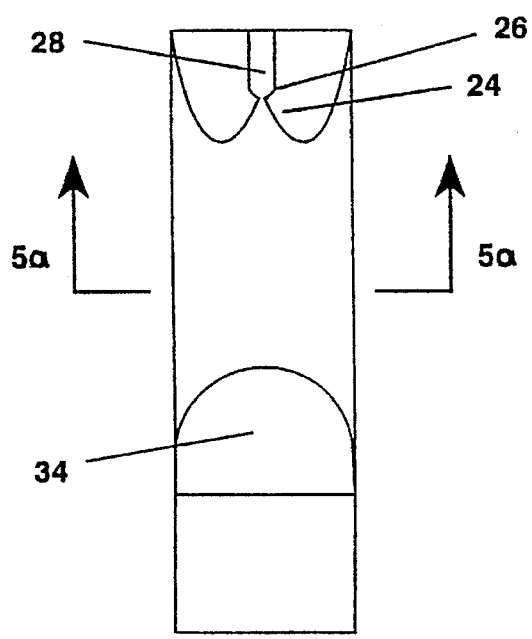
FIG. 5 is a front elevation view of the support.
Figure 5A:
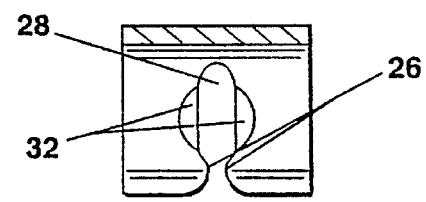
FIG. 5a is a sectional view taken on line 5b—5b in FIG. 5.

Referring now in detail to the drawings, a swivel hanging apparatus constructed in accordance with the present invention is illustrated. The apparatus comprises two parts. The first part is a mount 10; the second is a support 30. Each of the two parts is made as a single piece composed of various features. This permits each of the parts to be manufactured at high speed and low cost, utilizing mass production equipment; said mount being fabricated by die casting and said support by mill stamping. For commercial use the mount is desirably made of low-grade steel ahoy, while the support is made of high tensile steel. The apparatus can be used for any purpose that calls for the provision of an overhead support that can be rotated about a vertical axis. Typical purposes include the overhead support of plants, bird cages or electrical swag fixtures.

The mount 10 has five main structural features combined into a single piece. One of the structural features is a base 12. Another structural feature is a cross brace 14 with connective means 16. A third structural feature is an ornamental shell 18. The fourth structural feature is a pendant leg 20. The last structural feature is a spherical bearing 22.

The base 12 may be of any desired configuration and is dependent upon the ornamental design of shell 18. The shell shown here is of a simple hemispherical shape with decorative step-down ridges 19 on the outer surface. The base surface presents a smooth area to be butted firmly against a flat surface, such as a ceiling. Suitable means to secure the mount to the overhead surface is included. Such means constitutes a connective means with female threads 16 centered in a cross brace 14. Fastening means such as a lag screw 15 or hollow wall fastener with male treads is mated with the female threads in said brace.

Pursuant to a key feature of the present invention, extending from the inferior surface of mount 10 is pendant leg 20 which in turn supports spherical bearing 22. The size of said leg 20 and said bearing 22 is predetermined by aeshelics and structural strength requirements. Another key component to the invention is the support 30. The support includes on the superior aspect slot 28 which is slightly wider than leg 20 and is flared end 24 in the front. Flared end 24 tapers posteriorly and inwardly into keeper tabs 26, the distance between the tabs being narrower than said slot. The internal surface of the superior aspect has a concavity 32, dividing slot 28 equally. The concavity 32 has a smooth surface that mates with the superior hemisphere of bearing 22, by means of a ball and socket integration to improve rotation. Another key feature is the inferior aspect of support 30, which is the grab 34, shown here in the shape of a widened U hook. This section has the same width dimensions as the top which facilitates a torsion interlocking motion between the attaching support of the pendant object and the sides of the hook. The grab's superior internal dimension, anterior to posterior, is wide enough to accept the object desired while graduating to a smaller internal dimension at the bottom thereby locking the supporting structure of the pendant object into grab 34 by weight, torsion, and friction. The particular configuration of the grab will be governed by ornamental factors and by field requirements, that is to say, the mouth of the grab must be large enough to receive the pendant object desired, strong enough to carry the weight of the object with which the hook is intended to be employed and wide enough to initiate a torsion interlocking motion between the sides of the hook and the supporting structure of the pendant object.

OPERATION

To utilize the system, the mount 10 must be installed. To accomplish this, the installer couples the male threads of the fastener 15 with the connective means 16 located in the cross brace 14. After finding a suitable location on a ceiling, beam or the like, the installer rotates the mount until the fastener is completely engaged and the base 12 of said mount is firmly attached to the supporting surface. To connect the support 30 to the mount 10, said support is held horizontal with the flared end 24 against the pendant leg 20. The support is moved laterally until the leg 20 is past the keeper tabs 26 and then it is allowed to drop vertically whereby the concavity 32 will seat with the bearing 22. The two parts are now assembled and the operation complete with the grab 34 able to rotate through a 360 degree arc.

With the two parts thus assembled, the support cannot accidently be disengaged from the mount. If the support is jolted so as to tend to move it in any direction, it will not be able to uncouple from the leg since the keeper tabs prevent any transverse movement off the leg.

SUMMARY, RAMIFICATIONS, AND SCOPE

While my above description contains many specificities, these should not be construed as limitations on the scope of the invention, but as an exemplification of one preferred embodiment thereof. Many other variations are possible. For example, the pendant leg can be altered through a variety of degrees of arc for adaptation to sloped ceilings. An alternate embodiment on the superior aspect of the support utilizes a keyhole design. As various possible embodiments might be made on the above invention, and as various changes might be made in the embodiment above set forth, it is to be understood that all matter herein described or shown in the accompanying drawings is to be interpreted as illustrative, and not in a limiting sense.

Accordingly, the reader will see that there has been provided a swivel hanging apparatus that (1) can be rotated easily to any desired position (2) can be adapted for sloped ceilings (3) combines ornamental design with increased function by means of a ball and socket integration, which accomplishes all of the objects of the present invention and which is extremely well adapted to meet the conditions of practical use.

What is claimed is:

1. Overhead swivel hanging apparatus comprising:
   (A) a mount and
   (B) a support,
   (C) said mount including
      (i) a flat base,
      (ii) said base having a fastener for fixedly securing said mount to a support surface,
      (iii) a shell connected to said base,
      (iv) a pendant leg dependent from said shell,
      (v) a spherical bearing carried by said pendant leg at an end thereof opposite said shell;

(D) said support including
  (i) a generally C-shaped hook having a flange at one end thereof,
  (ii) said flange having a slot with flared ends,
  (iii) a pair of keeper tabs adjacent said flared ends,
  (iv) a concavity along an underside of said flange,
  (v) a grab carried by said hook adjacent an end thereof opposite said one end,
  (vi) said grab, said tabs, and said C-shaped hook being integrally formed as a single piece;
said support being secured to said mount with said slot receiving said pendant leg and said spherical bearing received in said concavity for supporting said support from said mount with said support freely rotatable relative to said mount, said pair of keeper tabs retaining said pendant leg in said slot.

2. Apparatus according to claim 1 wherein the dimension between said keeper tabs is narrower than the dimension of said pendant leg and said slot thereby preventing disengagement of said support from said pendant leg.

3. Apparatus according to claim 1 wherein said slot divides said concavity into equal parts on opposite sides of said slot.

4. Apparatus according to claim 1 wherein said grab is generally U-shaped.

5. Apparatus according to claim 1 wherein the dimension of a top internal surface of said grab is wider anterior to posterior, gradually diminishing at a bottom thereof.

* * * * *